US010372627B2

(12) United States Patent
Walker et al.

(10) Patent No.: US 10,372,627 B2
(45) Date of Patent: *Aug. 6, 2019

(54) METHOD TO GENERATE PATTERN DATA OVER GARBAGE DATA WHEN ENCRYPTION PARAMETERS ARE CHANGED

(71) Applicant: Western Digital Technologies, Inc., San Jose, CA (US)

(72) Inventors: William Jared Walker, Rochester, MN (US); Cory Lappi, Rochester, MN (US); Darin Edward Gerhart, Oronoco, MN (US); Daniel Robert Lipps, Kasson, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/704,866

(22) Filed: Sep. 14, 2017

(65) Prior Publication Data

US 2018/0018287 A1 Jan. 18, 2018

Related U.S. Application Data

(63) Continuation-in-part of application No. 15/226,639, filed on Aug. 2, 2016, now Pat. No. 9,959,218, which (Continued)

(51) Int. Cl.
*G06F 12/14* (2006.01)
*H04L 29/06* (2006.01)
(Continued)

(52) U.S. Cl.
CPC ...... *G06F 12/1408* (2013.01); *G06F 12/1416* (2013.01); *G06F 21/00* (2013.01);
(Continued)

(58) Field of Classification Search
None
See application file for complete search history.

(56) References Cited

U.S. PATENT DOCUMENTS

| 9,081,771 B1 | 7/2015 | Faibish et al. |
| 9,298,647 B2 | 3/2016 | Gerhart et al. |
| 9,436,618 B2* | 9/2016 | Gerhart ............... G09C 1/00 |
| 2003/0037248 A1 | 2/2003 | Launchbury et al. |

(Continued)

FOREIGN PATENT DOCUMENTS

| CN | 102099792 A | 6/2011 |
| JP | 2013-037417 A | 2/2013 |

OTHER PUBLICATIONS

"TCG Storage Security Subsystem Class: Opal"; Specification Version 1.0; Revision 1.0; Jan. 27, 2009; 81 pages.

(Continued)

*Primary Examiner* — Amir Mehrmanesh
(74) *Attorney, Agent, or Firm* — Vierra Magen Marcus LLP

(57) ABSTRACT

A memory device including at least one memory location for storing information representing data written using a first encryption/decryption method, and a read channel using a second encryption/decryption method for reading and decrypting information as written is disclosed. The memory device also includes an apparatus that prevents the reading of the at least one memory location using the second encryption/decryption method, in response to an indication that the at least one memory location was written using the first encryption/decryption method. In another embodiment, a reading of a predefined or custom code is returned in response to an indication of another encryption/decryption method.

20 Claims, 6 Drawing Sheets

Related U.S. Application Data is a continuation of application No. 15/051,539, filed on Feb. 23, 2016, now Pat. No. 9,436,618, which is a continuation of application No. 14/467,724, filed on Aug. 25, 2014, now Pat. No. 9,298,647.

(51) Int. Cl.

| | | |
|---|---|---|
| *G06F 21/62* | (2013.01) | |
| *G06F 21/00* | (2013.01) | |
| *H04L 9/08* | (2006.01) | |
| *G09C 1/00* | (2006.01) | |
| *G06F 21/60* | (2013.01) | |
| *G06F 21/80* | (2013.01) | |

(52) U.S. Cl.
CPC ........ *G06F 21/602* (2013.01); *G06F 21/6227* (2013.01); *G06F 21/805* (2013.01); *G09C 1/00* (2013.01); *H04L 9/0891* (2013.01); *H04L 9/0894* (2013.01); *G06F 2221/2123* (2013.01); *G06F 2221/2143* (2013.01); *H04L 2209/12* (2013.01); *H04L 2209/34* (2013.01)

(56) References Cited

U.S. PATENT DOCUMENTS

| | | | |
|---|---|---|---|
| 2005/0010789 A1* | 1/2005 | Liang | G06F 12/1408 713/189 |
| 2007/0041231 A1* | 2/2007 | Ferren | G11B 20/00086 365/1 |
| 2007/0136607 A1 | 6/2007 | Launchbury et al. | |
| 2009/0307421 A1 | 12/2009 | Galloway et al. | |
| 2012/0163593 A1 | 6/2012 | Lejeune et al. | |
| 2012/0303970 A1 | 11/2012 | Koike et al. | |
| 2014/0136765 A1 | 5/2014 | Oh et al. | |
| 2016/0170909 A1 | 6/2016 | Gerhart et al. | |

OTHER PUBLICATIONS

Prosecution History from U.S. Appl. No. 14/467,724; dated Oct. 15, 2015 through Feb. 8, 2016; 19 pages.
Notice of Allowance from U.S. Appl. No. 15/051,539; dated May 11, 2016; 15 pages.
Chinese Office Action for Application No. 201510522786.8; dated Nov. 27, 2017; 6 total pages.

\* cited by examiner

| LOGICAL BLOCK ADDRESS | PHYSICAL BLOCK ADDRESS | NUMBER OF BLOCKS | ENCRYPTION SCHEME USED |
|---|---|---|---|
| 1 | 2 | 8 | 1 |
| 2 | 172 | 21 | 1 |
| 3 | SSD 1 | 16 | 2 |
| 4 | 101 | 32 | 2 |

| LOGICAL BLOCK ADDRESS | PHYSICAL BLOCK ADDRESS | NUMBER OF BLOCKS | INVALID | ENCRYPTION SCHEME USED |
|---|---|---|---|---|
| 1 | 2 | 8 | 1 | 1 |
| 2 | 172 | 21 | 1 | 1 |
| 3 | SSD 1 | 16 | 0 | 2 |
| 4 | 101 | 32 | 0 | 2 |

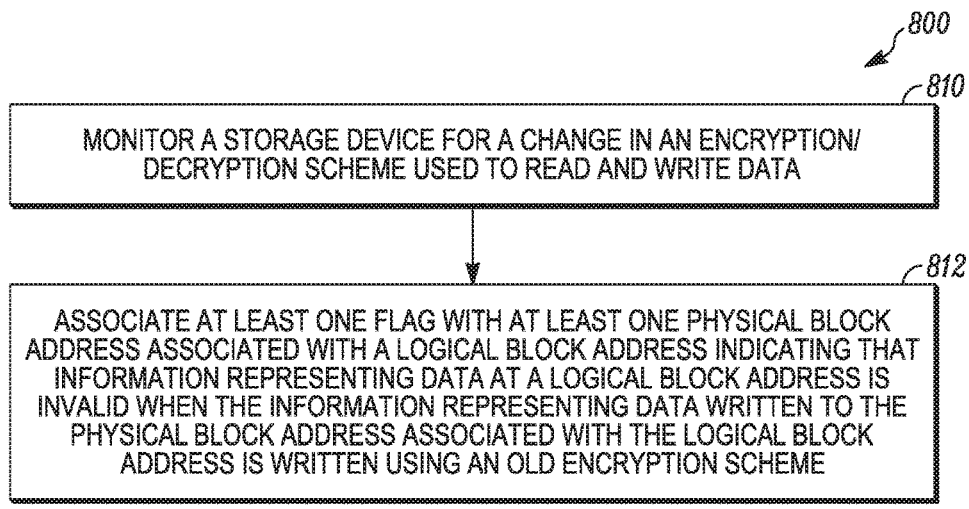
*FIG. 8*
| LOGICAL BLOCK ADDRESS | PHYSICAL BLOCK ADDRESS | NUMBER OF BLOCKS | ENCRYPTION SCHEME USED |
|---|---|---|---|
| 1 |  | 8 | 1 |
| 2 |  | 21 | 1 |
| 3 | SSD 1 | 16 | 2 |
| 4 | 101 | 32 | 2 |
*FIG. 9*
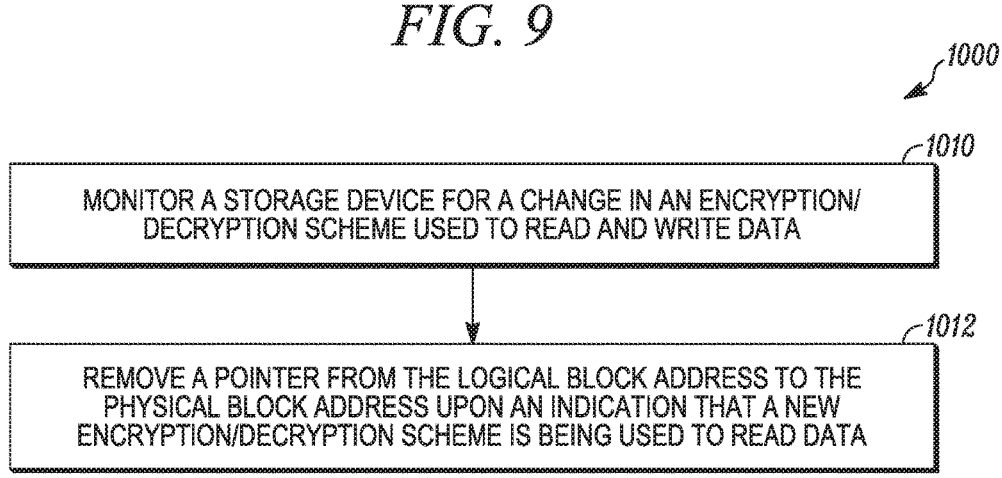
*FIG. 10*

METHOD TO GENERATE PATTERN DATA OVER GARBAGE DATA WHEN ENCRYPTION PARAMETERS ARE CHANGED

CROSS-REFERENCE TO RELATED APPLICATIONS

This application is a continuation-in-part of U.S. patent application Ser. No. 15/226,639, filed Aug. 2, 2016, which application is a continuation of U.S. patent application Ser. No. 15/051,539, filed Feb. 23, 2016 and now issued as U.S. Pat. No. 9,436,618, which is a continuation of U.S. patent application Ser. No. 14/467,724, filed Aug. 25, 2014 and now issued as U.S. Pat. No. 9,298,647. Each of the aforementioned related patent applications is herein incorporated by reference.

BACKGROUND OF THE DISCLOSURE

Field of the Disclosure

Various embodiments described herein relate to a method and apparatus that is used to prevent the generation of garbage data after certain parameters associated with the data, such as an encryption parameter, are changed.

Description of the Related Art

Storing data includes writing information representing the data to a storage device or apparatus. There are many types of storage devices. Even though varied, most of the storage devices have common goals. Among the goals are to store increased amounts of data, and to provide a means to make sure the data as stored is secure. Encryption is one way to make the data secure. Encryption is the process of encoding information in such a way that only authorized parties can read it. Encryption doesn't prevent hacking but it reduces the likelihood that the hacker will be able to read the data that is encrypted. In an encryption scheme, the information, referred to as plaintext, is encrypted using an encryption algorithm, turning it into an unreadable ciphertext. This is usually done with the use of an encryption key, which specifies how the message is to be encoded. Any adversary that can see the ciphertext should not be able to determine anything about the original information. An authorized party, however, is able to decode the ciphertext using a decryption algorithm, that usually requires a secret decryption key, that adversaries do not have access to. For technical reasons, an encryption scheme usually needs a key-generation algorithm to randomly produce keys.

From time to time, encryption parameters, such as encryption/decryption keys, can be changed for a storage device. When encryption parameters are changed, like a key or range parameter, it is possible to have garbage data with cyclic redundancy check ("CRC") errors in the logical block address ("LBA") space of the change.

Currently, a solution for preventing the CRC errors is to disable all data protection on encrypted drives. This exposes the data. The data is not secure when the data protection scheme is disabled. Of course, this solution falls short of certain standards for the security of the data. Many manufacturers that use storage devices in products they offer qualify the storage devices on the basis of compliance with standards. Turning off the security feature prevents proper T10 data protection on encrypted storage devices. Another standard many have to comply with is the Opal SSC standard. The standard states that:

"The Opal SSC is an implementation profile for Storage Devices built to:
  Protect the confidentiality of stored user data against unauthorized access once it leaves the owner's control (involving a power cycle and subsequent deauthentication)
  Enable interoperability between multiple SD vendors
"An Opal SSC compliant SD:
  Facilitates feature discoverability
  Provides some user definable features (e.g. access control, locking ranges, user passwords, etc.)
  Supports Opal SSC unique behaviors (e.g. communication, table management) [Section 2.1, page 10/81]

If the data is secure at all times, the confidentiality of stored user data is protected against unauthorized access once it leaves the owner's control. In addition, meeting a standard for security of the data on a storage apparatus enables interoperability between multiple storage device vendors. Meeting a standard also facilitates feature discoverability, provides some user definable features (e.g. access control, locking ranges, user passwords, etc.) and supports unique behaviors (e.g. communication, table management).

SUMMARY OF THE DISCLOSURE

A memory device including at least one memory location for storing information representing data written using a first encryption/decryption method, and a read channel using a second encryption/decryption method for reading and decrypting information as written is disclosed. The memory device also includes an apparatus that prevents the reading of the at least one memory location using the second encryption/decryption method, in response to an indication that the at least one memory location was written using the first encryption/decryption method. The apparatus that prevents the reading of the at least one physical block address includes a device for associating a flag with the at least one memory location written using the first encryption/decryption method. The apparatus that prevents the reading of the at least one physical block address also includes a device for returning predefined pattern content for the at least one memory location written using the first encryption/decryption method in response to an indication the read channel uses a second encryption/decryption method. The apparatus that prevents the reading of the at least one memory location written with the first encryption/decryption method, in one embodiment, includes a device for writing a predefined pattern to the at least one memory location written using the first encryption/decryption method.

A storage apparatus includes a solid state device having a plurality of memory locations, a write channel for writing information representing data to the plurality of memory locations in a solid state device, and a read channel for reading information representing data from the plurality of memory locations in a solid state device. The storage apparatus also includes a controller that controls operations of the storage apparatus including the writing of information to the plurality of memory locations in a solid state device and the reading of information representing data from the plurality of memory locations in a solid state device. The storage apparatus also includes an indirection system further including a set of logical block addresses, and a set of physical block addresses that correspond to the plurality of memory locations in the solid state device of the storage apparatus. The indirection system also includes a map that associates a logical block addresses to at least one physical block address. The map also includes at least one flag indicating an encryption/decryption method used to write and read data from the physical block address. The controller returns a reading of a predefined or custom code when the encryption/decryption method used to read the physical block address has changed.

A method for decreasing the generation of garbage data in a storage apparatus includes monitoring a storage apparatus for a change in an encryption/decryption scheme used to read and write data, and in response to the change in encryption/decryption scheme, causing at least one logical block address to return an indication of being written in a predefined or custom code when the physical block address associated with the logical block address had been encrypted using the old encryption/decryption scheme.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 8 is a method for returning a predefined or custom code from data written with a different or old encryption scheme, according to an example embodiment.

FIG. 9 is yet another type of table associated with an indirection controller of a memory device, according to an example embodiment.

FIG. 10 is a flow diagram of a method for preventing the generation of garbage data, according to an example embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1B:
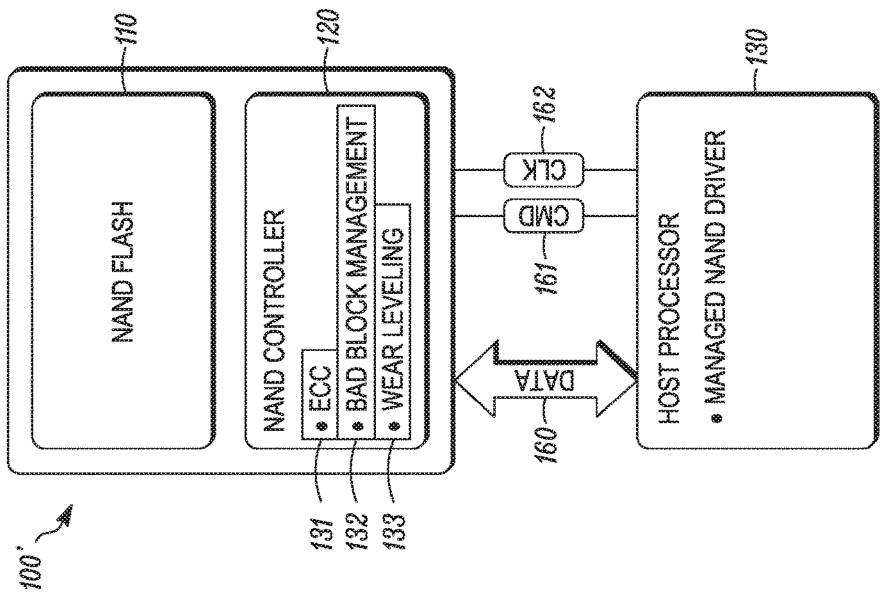
FIG. 1B is another schematic diagram of NAND flash type memory device, according to an example embodiment.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

In general, this disclosure describes techniques for writing and reading data to a solid state device or other storage medium such as hard disk drives, hybrid devices, and the like. In this particular application, this disclosure describes writing and reading information representing data to a flash memory-based solid state device. It should be noted that this is one type of storage medium or solid state device and that the disclosure could be used in solid state devices that employ other types of storage technologies. In other words, the disclosure is not limited to flash memory and could be used in other types of memory, such as phase-change-memory (PCM), Magnetoresistive random-access memory (MRAM), Resistive random-access memory (RRAM or ReRAM), or the like.

Now, returning to the discussion of flash memory. There are two main types of flash memory, which are named after the type of logic gates used to form the flash memory. There is NAND type flash memory, and NOR type flash memory. The internal characteristics of the individual flash memory cells exhibit characteristics similar to those of the corresponding gates. NAND type flash memory can be easily written and read in blocks (or pages) which are generally much smaller than the entire device. NOR type flash allows a single machine word (byte) to be easily written—to an erased location—or read independently. The NAND type is primarily used in main memory, memory cards, USB flash drives, solid-state drives, and similar products, for general storage and transfer of data. The NOR type, which allows true random access and therefore direct code execution, is used as a replacement for the older EPROM and as an alternative to certain kinds of ROM applications, whereas NOR flash memory can emulate ROM primarily at the machine code level; many digital designs need ROM (or PLA) structures for other uses, often at significantly higher speeds than (economical) flash memory may achieve.

Figure 2:
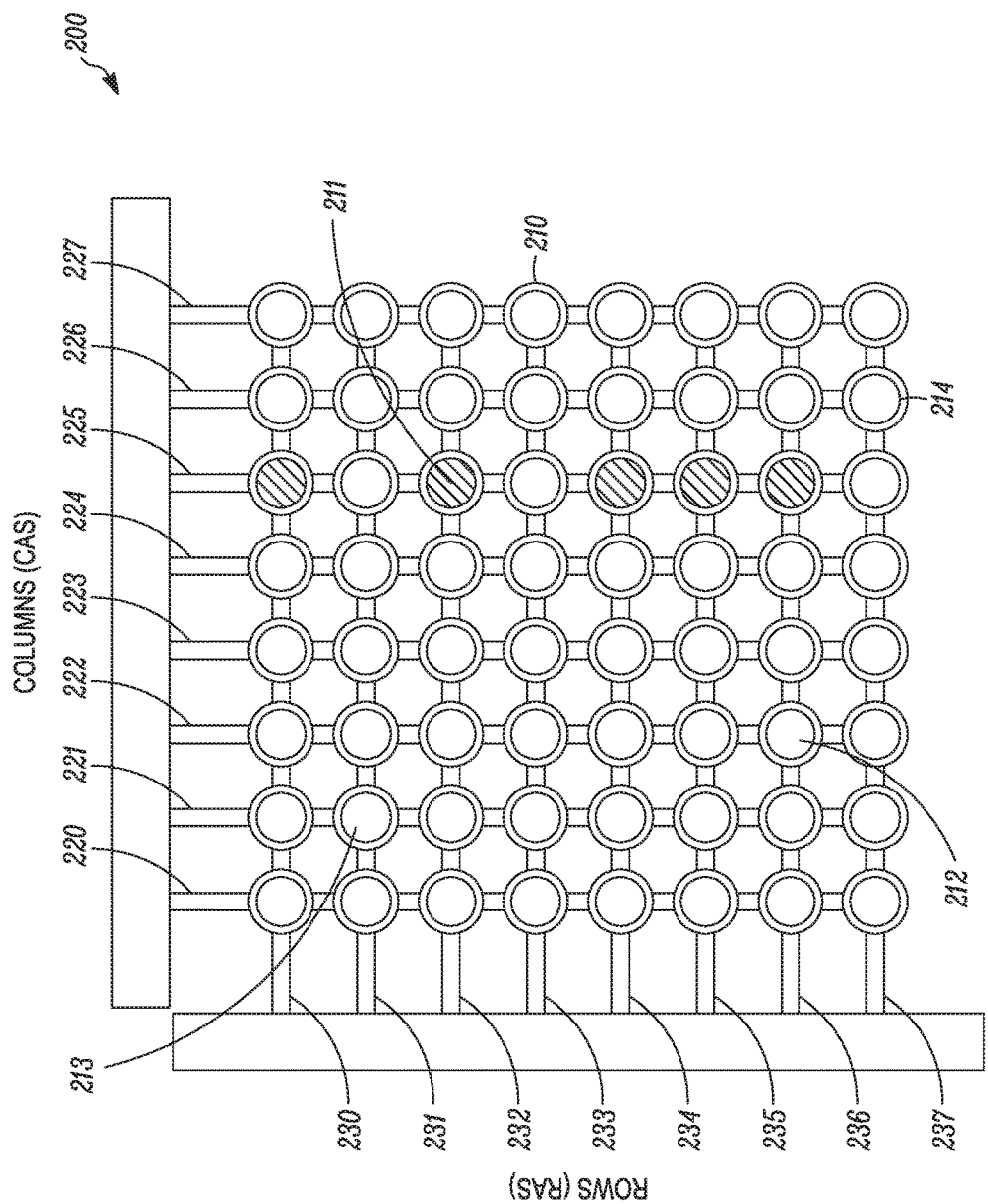
FIG. 2 is a schematic diagram of a memory apparatus or device, according to an example embodiment.

FIG. 2 is a schematic diagram of a memory apparatus or device 200. Memory is made up of memory locations or bits 210, 211, 212, 213, 214 arranged in a two-dimensional grid. The bits 210, 211, 212, 213, 214 are arranged in columns (CAS) 220, 221, 222, 223, 224, 225, 226, 227 and rows (RAS) 230, 231, 232, 233, 234, 235, 236, 237. Each bit can be identified by a column and row. For example, bit 211 is in column 225 and row 232. This particular bit is cross hatched to represent a "1" value. A bit not cross hatched, such as bot 214, represents a "0" value. It is to be understood that while 8 rows and 8 columns have been shown, more or less columns and more or less rows are contemplated. Thus, the disclosure is not limited to 8 rows and 8 columns.

To write data to a column, a column is selected and then rows are charged to write data into the bits associated with the specific column. As an example, when column 225 is written, column 225 is selected. Rows 230, 232, 234, 235 and 236 are charged resulting in a "1" value stored at the particular bit locations (shown as cross hatched).

Put another way, memory cells are etched onto a silicon wafer in an array of columns (bitlines) and rows (wordlines). The intersection of a bitline and wordline constitutes the address of the memory cell.

A charge is passed through the appropriate column (CAS) to activate the transistor at each bit in the column. When writing, the row lines contain the state the capacitor should take on. When reading, a sense-amplifier determines the level of charge in the capacitor. If it is more than 50 percent, it reads it as a 1; otherwise it reads it as a 0. The counter tracks the refresh sequence based on which rows have been accessed in what order. The length of time necessary to do all this is expressed in nanoseconds.

Memory cells alone would be worthless without some way to get information in and out of them. Memory devices include circuits associated with the memory to identify each row and column, to read and restore signals from cells, and to enable charges at various memory addresses.

Figure 1A:
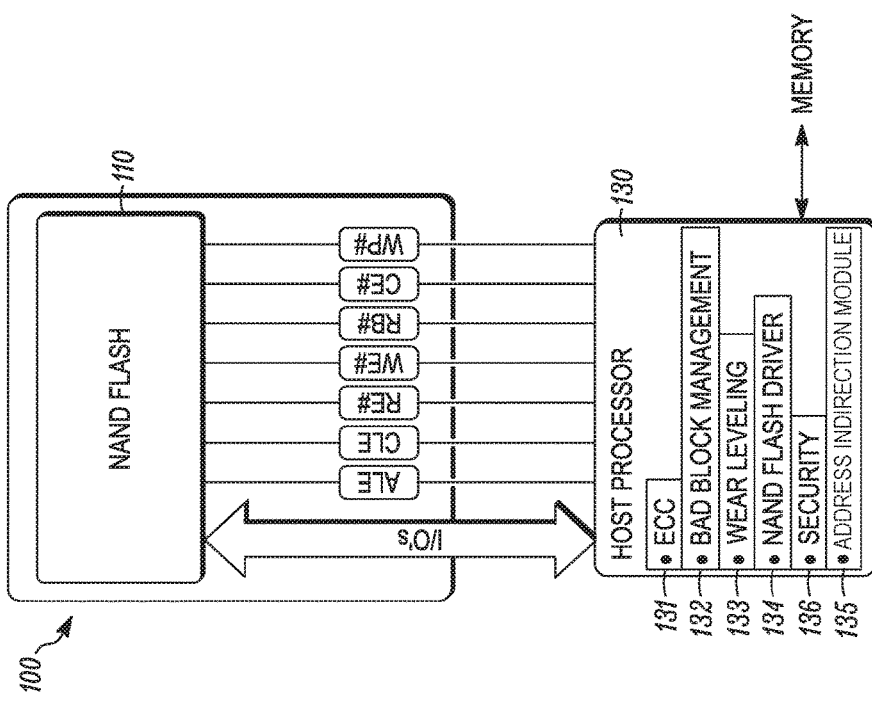
FIG. 1A is a schematic diagram of NAND flash type memory, according to an example embodiment.

FIGS. 1A and 1B each show a schematic diagram of NAND flash type memory 100 and 100', according to an example embodiment. In each case, a NAND Flash solid state device 110 is attached to a host computer via a host processor 130. In FIG. 1A, the host processor 130 handles many of the operations associated with reading and writing information representing data to the NAND flash solid state device 110. The host processor 130 includes an error correction code (ECC) module 131, bad block management module 132, a wear leveling module 133, a NAND Flash driver module 134, and address indirection module 135. All of these modules can be hardware, software or a combination of hardware and software. The error correction code (ECC) module 131 handles the determination of an error in data read and the application of error correction code (ECC) to the data as read. The error correction code is used to locate and correct the error in a block of data as read.

The bad block management module 132 handles bad blocks in the NAND Flash 110. Data from a host will generally come from the host as a block of data. The block of data can be of any length, although 512 bytes and 4096 have been standardized lengths and are very common. The NAND Flash is able to receive blocks of data. The manufacturing of a solid state device, in some instances, is less than perfect. As a result, there may be one or more memory locations which are defective and will not allow a block of data to be stored reliably there so that it can be later retrieved. The bad block management module 132 stores these bad block locations and prevents data from being stored there. Bad blocks can also appear during the life of the NAND Flash 110 so the bad block management module 132 also notes any other memory locations that have developed into bad blocks.

The address indirection module 135 works in concert with the bad block management module 132. The address indirection module 135 includes a mapping of actual physical block addresses (PBAs) to logical block addresses (LBAs). The LBAs stay constant. The host can then give a command to write to a particular LBA. The actual address where the data is stored (PBA) can change. The address indirection module 135 tracks the location of the LBA as written to or stored on the NAND Flash 110. Thus, when the host needs to read data from the NAND Flash 110, the address indirection module 135 makes sure the proper PBA associated with the LBA is read to assure that the information representing the data is read and presented for further processing to duplicate the data as input to the NAND Flash solid state device. The address indirection module 135 is also necessary for wear leveling. If data is written to a particular memory location more than a number of wear cycles, the memory location can wear out or become unreliable. Wear leveling recognizes this and elongates the life of the memory by changing memory locations or actual physical locations where the information is written. The LBA will stay the same while the PBA will change to prevent excessive early wear.

The wear leveling module 133 monitors and manages where data is written. A NAND Flash has many memory locations where data can be written to. These memory locations "wear out" over time. The memory locations within a NAND Flash 110 can only be reliably rewritten for a number of cycles. The wear leveling module 133 monitors the number of reads and writes to various memory locations and will switch the memory location to elongate the life of the NAND Flash 110. For example, if only half of the memory locations were constantly written to that half of the NAND Flash would wear out. Although the entire device would not be worn out, the capacity to store data would be severely hindered resulting in poor performance. The wear leveling module 133 manages the wear on the NAND Flash 110. The wear leveling module 133 effectively lengthens the life of the NAND Flash 110. It too works with the address indirection module 135 as the wear leveling module 133 can decide a particular set of blocks (PBAs) need to be set aside to prevent premature wearing of the memory locations in the NAND Flash 110.

The NAND Flash driver module 134 is an instruction set for operation of the NAND Flash 110.

The solid state device 100 also includes a security module 136. The security module 136 encrypts data as written and decrypts the data when read. The encryption of the data keeps the data secure. It is important to keep the data secure at all times, according to common sense as well as certain criteria for products which must be met for the product to qualify for use in other products. In some instances, qualifying a product can include meeting a standard for security of the data. In some encryption and decryption schemes, a key piece of information (also known as a parameter) determines the functional output of a cryptographic algorithm or cipher. Without a key, the algorithm would produce no useful result. In encryption, a key specifies the particular transformation of plaintext into ciphertext, or vice versa during decryption. Keys are also used in other cryptographic algorithms, such as digital signature schemes and message authentication codes for products which standards organizations set. This particular disclosure deals with instances where a parameter is changed. For example, a key might be changed. It should be noted that when encoded information is read, the key associated with the writing must be used along with the algorithm to decode the information and transform it to the data as written. Without the parameter, or when the parameter is incorrect, the decoding algorithm does not work. An output of information representing data decoded with the wrong key is generally termed as garbage. It is not the original data as written. Garbage can also tax a data channel during an attempted read. For example, when garbage information is read, the error correction module will determine that there is a mistake in the data as read. The "error" resulting from garbage data will not be correctable on-the-fly. Depending on the scheme for error correction, the error correction module could seek to recover the data using various deep data recovery techniques. This wastes time and also will waste the time of the processor trying to correct the "error". This of course is just one example of the problems that can result from reading information which turns out to be garbage data.

FIG. 1B shows a schematic diagram of another type of NAND flash type memory device 100', according to an example embodiment. In each case, a NAND Flash solid state device 110 is attached to a host computer via a host processor 130. The main difference between memory device 100' and memory device 100, is the processor 120 which is located with the NAND type solid state device 100'. The processor 120 is separate from the host processor 130. The host processor 130, in the case of the NAND type solid state device 100', offloads some of the processing modules to the processor 120 associated with the NAND type solid state device 100'. The processor 120 can be a general purpose processor or can be a dedicated processor which handles a specific task or tasks. As shown in FIG. 1B, the processor 120 includes the error correction code (ECC) module 131, the bad block management module 132, and the wear leveling module 133, for example. These operations are passed off from the host processor 130 to the processor 120 or NAND controller. These blocks 131, 132, and 133 function in the same way as discussed above with respect to FIG. 1A. These functions will not be repeated here for the sake of brevity. In FIG. 1B, a data bus 160, a command line 161 and a clock signal 162 communicatively couple the host processor and the NAND controller or processor 120. Some of the commands passed over the command line 161 merely command one of the modules 131, 132, 133 to begin their specific processes. This is helpful in that the host processor 130 is freed up to do other tasks. The number of tasks passed off from the host to the NAND controller 120 is a matter of a balance of determining which tasks are totally specialized and better accomplished by the NAND controller 120. Other tasks may be more generally applicable and kept resident the host processor 130.

As described above, data stored on NAND type flash memory 110, 110' can be organized as data blocks. In some example embodiments, the address indirection is used to write blocks of data to NAND type flash memory 110, 110'. That is, host file systems deal with logical block addresses (LBAs) in commands to write blocks of data to NAND type flash memory 110, 110' and read blocks of data from the NAND type flash memory 110, 110' without regard for actual locations in the NAND type flash memory 110, 110'. The actual physical address is the physical block address (PBA) used internally by the NAND type flash memory 110, 110'. Address indirection is typically implemented in the controller portion of the memory device's architecture (e.g., NAND controller 120 of FIG. 1B) using indirection tables which are used to keep track of the physical location associated with a LBA. Put another way, the indirection tables map the LBA to a PBA in the NAND type flash memory 110, 110'.

As described above, data is typically written to or read from NAND type flash memory 110, 110' in blocks or sectors contained in a set of memory locations within the NAND type flash memory 102. The block sizes can be 512 bytes or 4096 bytes, in some embodiments.

Figure 3:
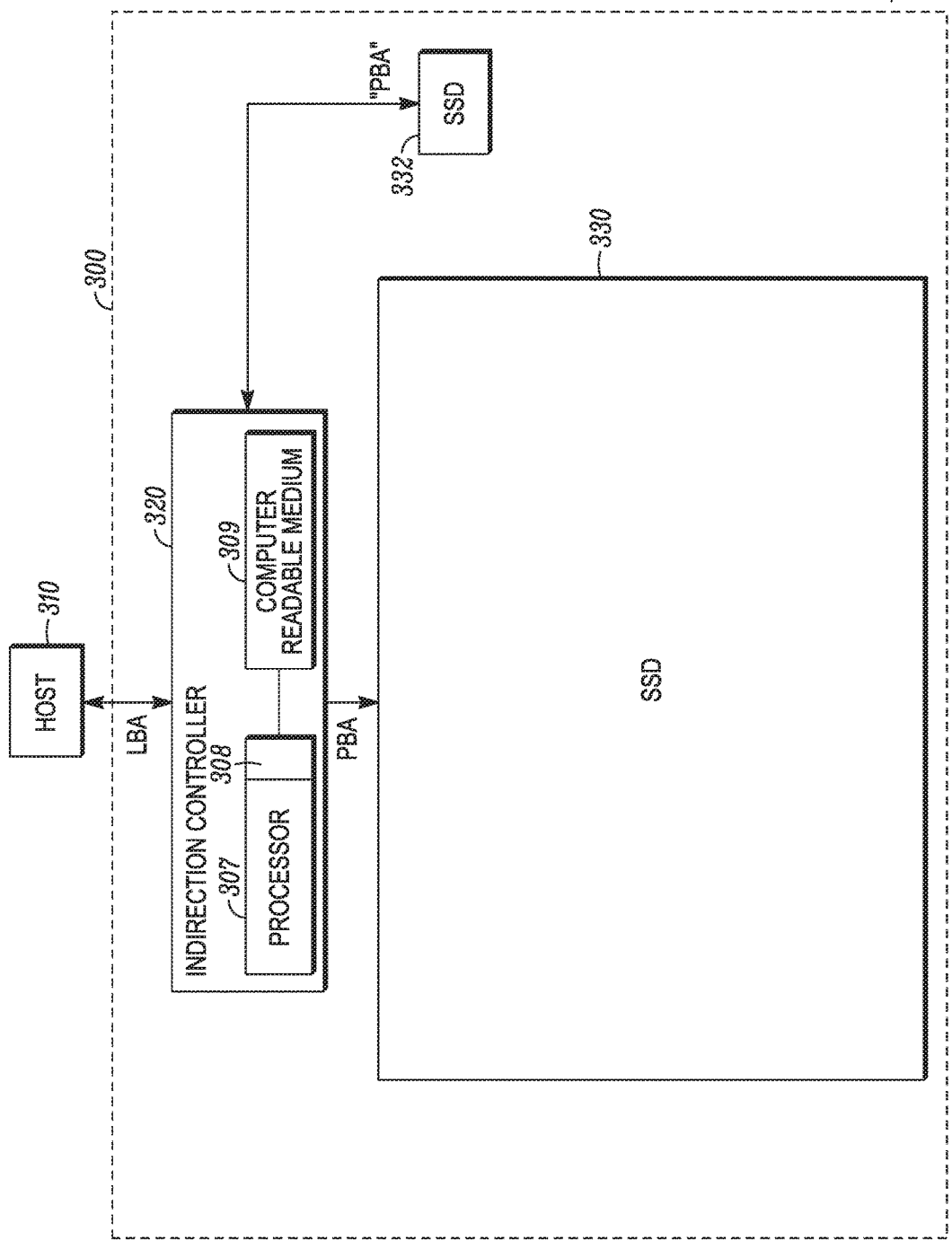
FIG. 3 is schematic of an indirection system of a memory device, according to an example embodiment.

FIG. 3 is schematic of an indirection system of a storage device 300, according to an example embodiment. More specifically, FIG. 3 is a schematic diagram of the storage system 300 communicatively coupled to a host computer 310. The storage system 300 receives write commands from the host 310. The storage system 300 stores information representative of data in logical block addresses (LBAs). The storage system 300 also retrieves information or reads the data and delivers logical block addresses (LBAs) back to the host 310. As shown, the storage system 300 includes an indirection system 320, a first memory device 330, and a second memory device 332. The indirection system 320 can map LBAs to one or more memory devices, such as memory device 330 and 332. The first memory device 330 and the second memory device 332 can be a NAND flash 110, 110', or a general memory device, such as device 200. The host system 310 can be a processor, an independent computer system, a server system, or other hardware component that communicates with the storage device 300.

Indirection controller 320 includes processor 307, memory 308 communicatively coupled to the processor 307, and computer readable medium 309. Processor 307 may be a programmable logic controller (PLC), micro-processor or micro-controller. Computer readable medium 309 can be separate from the memory devices 330, 332 or can refer to space reserved within memory devices 330, 332 for storing data structures and/or instructions for execution by processor 307.

Indirection controller 320 provides a dynamic translation layer between logical block addresses (LBAs) utilized by host system and physical blocks addresses (PBAs) used to access data stored in the solid state device 330, 332. The "physical block address" corresponds to an actual memory location or a plurality of actual memory locations within the memory devices 330, 332. The indirection controller 320 manages the assignment of LBAs to PBAs. In some storage systems, mapping LBAs to PBAs remains relatively static because individual memory cells may be re-written very infrequently. In more complex architectures, the mapping between LBAs and PBAs can change with every write operation because the system dynamically determines the physical location (i.e., PBA) assigned a particular logical location (i.e., LBA). The data for the same LBA will be written to a different location the next time the host LBA is updated. In this way, indirection controller 320 provides a dynamic translation layer between LBAs provided by host system 310 and PBAs associated with memory devices 330, 332. Indirection controller 320 is responsible for managing the assignment of LBAs to the plurality of PBAs In order to keep data in memory devices 330, 332 secure, many times the data is encrypted using a key or other parameter. As long as the key or other parameter stays the same, the data is secure. The key or other parameter is used to encrypt the data before writing the data to the memory device 330, 332. The key or other parameter is also used to decrypt the information as read from the memory device 330, 332 to decode the information and transform it back to the data as written. Problems occur when the key or other parameter is changed from the key or other parameter as written. If a key or other parameter used to write the data is changed, decoding or decrypting the information will not result in the data as written. In fact, meaningless or "garbage" data is returned. This can trigger many time consuming processes such as error recovery procedures which may slow the responsiveness of the storage system 300. It is not desirable to have slow response times. Rather than trigger these procedures that may degrade the performance of the storage system 300, the storage system 300 is provided with a method of returning a more desirable response. These are described below. These avoid "garbage" data and produce a response as though no data or information was present.

This disclosure now describes ways to generate a reading of predefined pattern content from memory devices that have been previously written with a different writing parameter. One writing parameter that could be changed is a key which is generally used to write the information representing data. Rather than read back "garbage" data or information, an indication of predefined pattern content is generated. For example, predefined pattern content may be indicated by a reading of all "1's" or all "0's" or a predefined or custom code for a block or set of blocks of data. The generation of predefined pattern content is accomplished as the data is read while keeping the security measures in place. As mentioned above, this is a requirement for many devices as manufacturers do not want to expose the data.

Figures 4, 5:
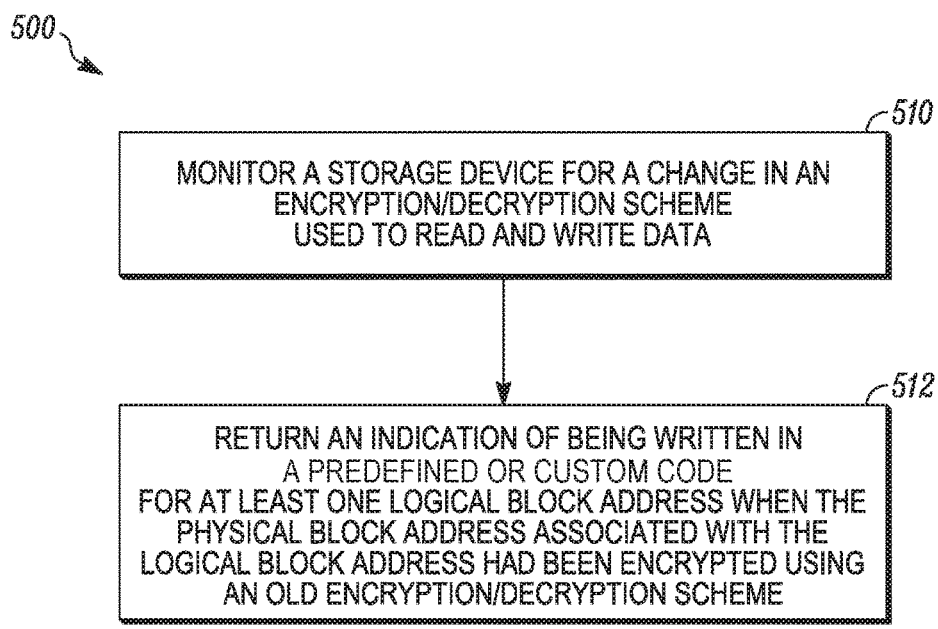
FIG. 4 is one type of table associated with an indirection system of a memory device, according to an example embodiment.
FIG. 5 is a method for returning a predefined or custom code from data written with a different or old encryption scheme, according to an example embodiment.

FIG. 4 is one type of table 400 associated with an indirection controller 320 of a memory system 300, according to an example embodiment. The table 400 is stored in memory 308 of the indirection controller 300. The table 400 includes a logical block address 410, a physical block address 420, a number of blocks 430, and an encryption scheme 440. The number of blocks is the length of the string of logical block addresses or physical block addresses. For example, the logical block address "1" starts at physical block address "2" and is eight blocks long. The encryption scheme is designated by a "1". The table 400 is a map of the logical block addresses to the physical block addresses within the memory devices 330, 332. Logical block address 3 has a starting address "SSD 1" which corresponds to a solid-state device, such as SSD 332 shown in FIG. 3. The table 400 includes a number of pointers. A pointer is a variable that contains the memory location (address) of some data rather than the data itself. In other words, the physical block address 420 for each of the blocks of data could be termed a pointer as it is the address of the beginning of the block of data, whether it is within the first memory device 330 or the second memory device 332.

There are several methods for returning a predefined or custom code from data that has been written with an old or another encryption scheme. The several methods will be discussed with respect to the tables, such as table 400, and other tables introduced below.

When encryption parameters have changed, for example a key or range parameter, it is possible to have garbage data with CRC errors in the LBA space of the change. Automatically generating pattern data into that space will allow the host system to read data without getting garbage or data protection errors. As discussed herein, when the encryption parameters have changed, the indirection parameters need to be wiped out (for drives with indirection systems). In one embodiment, the hardware is flagged when reading obviously invalid encrypted data so that the hardware generates pattern data. In another embodiment, pattern data is written to the affected areas physically in the background. The pattern data can be a default pattern known by the drive firmware, or specified by the host. In other words, the pattern data can be the predefined or custom code. In one example, the predefined or custom code can be all zeros. In another example, the predefined or custom code can be all ones. In still another example, the predefined or custom code can be a mixture of ones and zeros arranged in a specific pattern.

The host may specify the pattern on the format command itself or on a dedicated command prior to formatting. In SSD or shingled magnetic recording (SMR), the data would be "unmapped" or "trimmed" by the firmware when the parameters are changed by removing the entries for those LBAs from the indirection system. For drives that do not indirect request, a separate table of invalid LBAs may be created that can flag the hardware to generate pattern data. The pattern data would not actually be read from the drive and would instead be generated by the firmware, hardware, or a combination fo firmware and hardware, and sent to the host. The drive may also write pattern data to the affected area at the time of the change. In one embodiment, the pattern data is written in the background. When writing the pattern data at the time of change, the pattern data is generated on the fly for only the affected sectors. Thus, reads would be serviced normally. By using pattern data, the host can receive expected pattern data immediately following a format, unmap, or key erase operation without the need to first write all affected sectors.

FIG. 5 is a method 500 for returning the predefined or custom code from data written with a different or old encryption scheme, according to an example embodiment. The method 500 includes monitoring the memory or storage device for a change in the encryption/decryption scheme used to read and write the data 510. Monitoring the storage device for the change in the encryption/decryption scheme includes monitoring column 440 of the table 400. Column 440 provides an indication of the encryption scheme used. As shown in FIG. 4, the encryption scheme used for logical block addresses 1 and 2 is depicted by a value of "1" in column 440 of the table 400. This is a different or an old encryption scheme in this example embodiment. The encryption scheme used for logical block addresses 3 and 4 is depicted by a value of "2". This is a new encryption scheme which is different from the encryption scheme used to write the data associated with logical block addresses 1 and 2. The method 500 includes returning an indication of being written in the predefined or custom code for at least one logical block address when the physical block address associated with the logical block address has been encrypted using an old encryption/decryption scheme 512. In this case, the value "1" in column 440 indicates that an old encryption scheme was used for logical block addresses 1 and 2. The new encryption scheme or changed or different encryption scheme is depicted by a value of "2" in column 440 of table 4. The current encryption scheme is depicted by the value of "2". As a result, the read channel will be provided with an input of the predefined or custom code for the data associated with logical block addresses 1 and 2 since the indicated encryption scheme associated with that data has a value of "1".

Figures 6, 7:
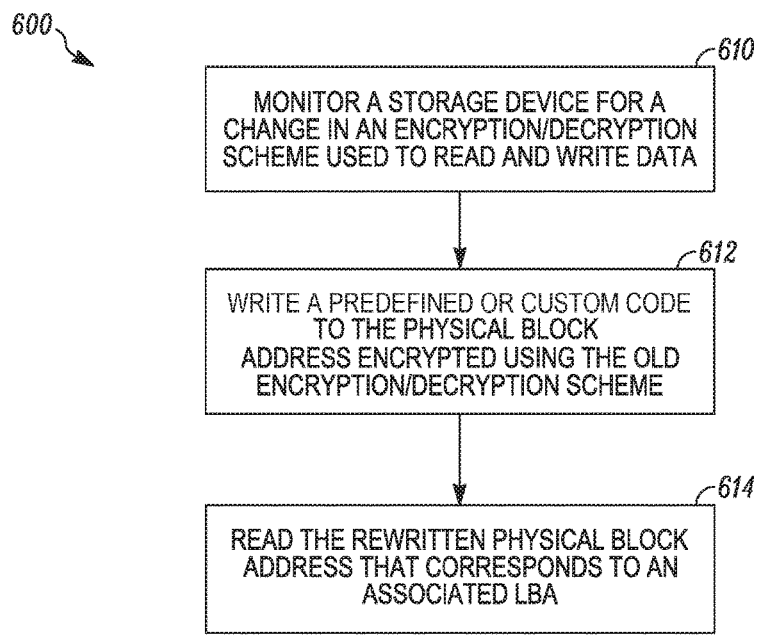
FIG. 6 is a method for returning a predefined or custom code from data written with a different or old encryption scheme, according to an example embodiment.
FIG. 7 is another type of table associated with an indirection controller of a memory device, according to an example embodiment.

FIG. 6 is a method 600 for returning the predefined or custom code from data written with a different or old encryption scheme, according to an example embodiment. The method 600 includes monitoring the memory device for a change in the encryption/decryption scheme used to read and write the data 610. Monitoring the memory device for the change in the encryption/decryption scheme includes monitoring column 440 of the table 400, shown in FIG. 4. Once it is determined that some of the data associated with certain logical block addresses have been encrypted using an old or different encryption scheme, the predefined or custom code is written to the physical block address is previously encrypted using the old encryption/decryption scheme 612. Therefore in FIG. 4, the data is associated with logical block addresses 1 and 2 will be over written or rewritten with the predefined or custom code. More particularly physical block address 2 and the eight physical block addresses associated with logical block address 1, will be overwritten with the predefined or custom code. Similarly, physical block address 172 and the 21 physical block addresses associated with logical block address 2 will also be overwritten with the predefined or custom code. Thus, at the actual, physical memory locations indicated by the table 400, there will be the predefined or custom code written to those data locations.

The method also includes reading the rewritten physical block addresses that correspond to the associated logical block addresses 614. In other words, the physical block addresses associated with the logical block address will have the predefined or custom code written thereto. When read, the predefined or custom code will be returned to the read channel rather than garbage data. Again it should be noted that the logical block addresses that are rewritten with the predefined or custom code are the ones where an old or different encryption scheme is used, such as the logical block addresses 1 and 2 as shown in FIG. 4. This assumes that the encryption scheme 2 is the current encryption scheme.

FIG. 7 is another type of table 700 associated with an indirection controller 300 of storage system 300, according to an example embodiment. The table 700 includes columns for the logical block addresses 710, the physical block addresses which correspond to the logical block addresses 720, the number of blocks written 730, an indication of invalidity 734, and an indication of the encryption scheme used 740. As shown in FIG. 7, when an old or different encryption scheme is used, the logical block address is flagged or indicated as invalid as depicted by column 734 in table 700. The current encryption scheme is depicted by the number "2" and the old or different encryption scheme is depicted by the number "1" in column 740 of table 700. In column 734, the first two entries that correspond to logical block addresses "1" and "2" carry a value of 1 which indicates that the data associated with those logical block addresses is invalid. The remaining two entries for logical block addresses "3" and "4" have a value of "0" which indicates that these logical block addresses or the information representing data in these logical block addresses was written with the current encryption scheme.

FIG. 8 is a method 800 for returning a predefined or custom code from data written with a different or old encryption scheme, according to an example embodiment. The method 800 includes monitoring the storage system, and specifically a memory device 330, 332, for a change in the encryption/decryption scheme used to read and write the data 810. Monitoring the memory device for the change in the encryption/decryption scheme includes monitoring column 740 of the table 700, shown in FIG. 7. Setting the in the invalidity to a value of "1" can also be termed as setting a flag with respect to the logical block addresses "1" and "2". A flag is a marker of some type used by computer processing or interpreting information. A flag as a signal indicating the existence or status of a particular condition. In this example embodiment the particular big condition is that the data or information representing data associated with a particular logical block address was written with an encryption scheme that differs from the current encryption scheme being used. This is indicated by the value of one in the invalidity column 734 of the table 700. The method 800 also includes associating at least one flag with at least one physical block address that is associated with a logical block address that indicates that the information representing data at the associated physical block address is written using an old encryption scheme 812. The read channel or the controller that controls a read channel will not read the physical block addresses of the invalid data and will return a reading of the predefined or custom code for further processing. In other words, the predefined or custom code will be returned based on the indication of invalidity of the logical block addresses. This prevents the return of garbage data from the physical block addresses associated with the logical block addresses.

FIG. 9 is yet another type of table 900 associated with an indirection controller 300 of a storage device 300, according to an example embodiment. In this particular embodiment, when it is determined that the encryption scheme used does not match the current encryption scheme, the physical block address for a particular logical block address is removed. In other words, the pointer which shows the starting physical block address is removed. This is shown in table 900 in column 920. More specifically, the physical block addresses indicating the starting physical block address for logical block addresses "1" and "2" have been removed since the encryption scheme, indicated by a value of "1", is old or different from the current encryption scheme. Without a physical block address for a starting point, the memory device assumes that the logical block address corresponding to the values of "1" and "2" are empty and therefore will automatically return the predefined or custom code as read from the logical block addresses.

FIG. 10 is a flow diagram of a method 1000 for preventing the generation of garbage data, according to an example embodiment. The method 1000 includes monitoring the storage apparatus or memory device for a change in the encryption/decryption scheme used to read and write the data 1010. Monitoring the storage apparatus for the change in the encryption/decryption scheme 1010 includes monitoring column 440 of the table 900, shown in FIG. 9. The method also includes removing a pointer from the logical block address to the physical block address upon an indication that a new encryption/decryption scheme is being used to read the data 1012. In other words, the pointer associated with the information representing data written with an old or different encryption/decryption scheme will be removed so that the logical block address appears empty. When no data is at a logical block address, the read channel will return the predefined or custom code to indicate that there is no data present. In this way, the reading of garbage data is prevented once again.

A memory device including at least one memory location for storing information representing data written using a first encryption/decryption method, and a read channel using a second encryption/decryption method for reading and decrypting information as written is disclosed. The memory device also includes an apparatus that prevents the reading of the at least one memory location using the second encryption/decryption method, in response to an indication that the at least one memory location was written using the first encryption/decryption method. The apparatus that prevents the reading of the at least one physical block address includes a device for associating a flag with the at least one memory location written using the first encryption/decryption method. The apparatus that prevents the reading of the at least one physical block address also includes a device for returning predefined pattern content for the at least one memory location written using the first encryption/decryption method in response to an indication the read channel uses a second encryption/decryption method. The apparatus that prevents the reading of the at least one memory location written with the first encryption/decryption method, in one embodiment, includes a device for writing a predefined or custom code to the at least one memory location written using the first encryption/decryption method. In one embodiment, the information representing data is in a block and the at least one memory location is at least one physical block address. In some embodiments, memory device also includes an indirection system. The indirection system includes at least one logical block address, and a database that maps the at least one logical block address to the at least one physical block address. In an embodiment, the indirection system includes an apparatus that makes the mapping of the at least one logical block address to the at least one physical address inaccessible in response to the read channel using a second encryption/decryption method when the at least one physical block address is written using the first encryption/decryption method. The second encryption/decryption method differs from the first encryption/decryption method. A second encryption parameter associated with the second encryption/decryption method differs from a first encryption parameter associated with the first encryption/decryption method. In another example embodiment, a second encryption range parameter associated with the second encryption/decryption method differs from a first encryption range parameter associated with the first encryption/decryption method. In still other embodiments, a second encryption key parameter of the second encryption/decryption method differs from a first encryption key parameter of the first encryption/decryption method.

A storage apparatus includes a solid state device having a plurality of memory locations, a write channel for writing information representing data to the plurality of memory locations in a solid state device, and a read channel for reading information representing data from the plurality of memory locations in a solid state device is disclosed. The storage apparatus also includes a controller that controls operations of the storage apparatus including the writing of information to the plurality of memory locations in a solid state device and the reading of information representing data from the plurality of memory locations in a solid state device. The storage apparatus also includes an indirection system further including a set of logical block addresses, and a set of physical block addresses that correspond to the plurality of memory locations in the solid state device of the storage apparatus. The indirection system also includes a map that associates a logical block addresses to at least one physical block address. The map also includes at least one flag indicating an encryption/decryption method used to write and read data from the physical block address. The controller returns a reading of the predefined or custom code when the encryption/decryption method used to read the physical block address has changed. In one example embodiment, the controller causes the physical block address to be written with the predefined or custom code in response to a change in the encryption/decryption method. In another example embodiment, the controller returns the predefined or custom code in response to an indication of to a change in the encryption/decryption method. In still another embodiment, the controller removes a pointer in the map between the logical block address and the physical block address in response to an indication of to a change in the encryption/decryption method. In yet another embodiment, the controller generates a flag indicating information at a physical block address is invalid in response to an indication of to a change in the encryption/decryption method. The controller controls the writing of information to the solid state device and the reading of information representing data from the solid state device. The indirection system includes a set of physical block addresses that correspond to actual memory locations of the solid state device. The map for associating logical block addresses to at least one actual memory locations of the solid state device also includes at least one flag indicating an encryption/decryption method used to write and read data from the actual memory locations of the solid state device. When the flag is set, the controller returns a reading of the predefined or custom code when the encryption/decryption method used to read the actual memory locations of the solid state device has changed.

A method for decreasing the generation of garbage data in a storage apparatus includes monitoring a storage apparatus for a change in an encryption/decryption scheme used to read and write data, and in response to the change in encryption/decryption scheme, causing at least one logical block address to return an indication of being written in the predefined or custom code when the physical block address associated with the logical block address had been encrypted using the old encryption/decryption scheme is disclosed. In one embodiment, the physical block address previously encrypted using the old encryption/decryption scheme is written as the predefined or custom code using the new encryption/decryption scheme. In another embodiment, a pointer from the logical block address to the physical block address is removed upon an indication that a new encryption/decryption scheme is being used to read data. This produces the predefined or custom code type reading and prevents the generation of garbage data. In still another embodiment, there are a plurality of logical block addresses that are associated with a plurality of physical block addresses written to with an old encryption/decryption scheme. The pointers for the plurality of logical block addresses are removed to the plurality of physical block addresses previously written with an old encryption/decryption scheme. In still another embodiment, the plurality of logical block addresses mapped to the physical block addresses in a map. The map further includes at least one flag indicating that information representing data at a logical block address is invalid when the information representing data written to the physical block address associated with the logical block address is written using an old encryption scheme.

In one or more examples, the functions described can be implemented in hardware, software, firmware, or any combination thereof. If implemented in software, the functions can be stored on or transmitted over, as one or more instructions or code, a computer-readable medium and executed by a hardware-based processing unit. Computer-readable media can include computer-readable storage media, which corresponds to a tangible medium such as data storage media, or communication media including any medium that facilitates transfer of a computer program from one place to another, e.g., according to a communication protocol. In this manner, computer-readable media generally can correspond to (1) tangible computer-readable storage media which is non-transitory or (2) a communication medium such as a signal or carrier wave. Data storage media can be any available media that can be accessed by one or more computers or one or more processors to retrieve instructions, code and/or data structures for implementation of the techniques described in this disclosure. A computer program product can include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions can be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein can refer to any of the foregoing structure or any other structure suitable for implementation of the techniques described herein. Also, the techniques could be fully implemented in one or more circuits or logic elements.

The techniques of this disclosure can be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units can be combined in a hardware unit or provided by a collection of interoperative hardware units, including one or more processors as described above, in conjunction with suitable software and/or firmware.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments. These and other example embodiments are within the scope of the following claims.

What is claimed is:

1. A system, comprising:
  an arrangement configured with:
    at least one physical memory location comprising at least one physical block address configured to store information representing data written using a first encryption/decryption method, wherein the information representing data is in a block; and
    a read channel configured to read and decrypt information using a second encryption/decryption method;
  an apparatus configured to, in response to an indication that the information was written to the at least one physical memory location using the first encryption/decryption method, prevent the read channel from reading the at least one physical memory location using the second encryption/decryption method by at least:
    associating a flag with the at least one physical memory location; and returning predefined or custom code for the at least one physical memory location in response to the read channel using the second encryption/decryption method, wherein the apparatus includes a device for writing a predefined or custom code to the at least one physical memory location written in response to the read channel using the second encryption/decryption method; and
  an indirection system comprising:
    at least one logical block address;
    a database configured to map the at least one logical block address to the at least one physical block address; and
    an apparatus configured to indicate the at least one logical block address inaccessible in response to the read channel using the second encryption/decryption method.

2. The system of claim 1, wherein a second encryption parameter associated with the second encryption/decryption method differs from a first encryption parameter associated with the first encryption/decryption method.

3. The system of claim 1, wherein a second encryption range parameter associated with the second encryption/decryption method differs from a first encryption range parameter associated with the first encryption/decryption method.

4. The system of claim 1, wherein a second encryption key parameter of the second encryption/decryption method differs from a first encryption key parameter of the first encryption/decryption method.

5. The system of claim 1, wherein the apparatus configured to prevent the reading of the at least one memory location comprises a device configured to:
  associate a flag with the at least one memory location; and
  return predefined pattern content for the at least one memory location in response to the read channel using the second encryption/decryption method.

6. The system of claim 1, wherein the database includes at least one flag indicating an encryption/decryption method used to write and read data from the physical block address.

7. A memory device, comprising:
  at least one physical memory location comprising at least one physical block address configured to store information representing data written using a first encryption/decryption method, wherein the information representing data is in a block;
  a read channel configured to read and decrypt information using a second encryption/decryption method;

an apparatus configured to, in response to an indication that the information was written to the at least one physical memory location using the first encryption/decryption method, prevent the read channel from reading the at least one physical memory location using the second encryption/decryption method by at least: associating a flag with the at least one physical memory location; and returning predefined or customer code for the at least one physical memory location in response to the read channel using the second encryption/decryption method, wherein the apparatus includes a device for writing a predefined or custom code to the at least one physical memory location written in response to the read channel using the second encryption/decryption method; and an indirection system comprising:
  at least one logical block address;
  a database configured to map the at least one logical block address to the at least one physical block address; and
  an apparatus configured to indicate the at least one logical block address inaccessible in response to the read channel using the second encryption/decryption method wherein the database includes at least one flag indicating an encryption/decryption method used to write and read data from the physical block address wherein the apparatus is configured to the at least one logical block address inaccessible when the at least one physical block address is written using the first encryption/decryption method, the first encryption/decryption method being different from the second encryption/decryption method.

8. A memory device, comprising:
at least one memory location configured to store information representing data written using a first encryption/decryption method;
a read channel configured to read and decrypt information using a second encryption/decryption technique connected to the at least one memory location; and
an apparatus configured to, in response to an indication that the information was written to the at least one memory location using the first encryption/decryption method, prevent the read channel from reading the at least one memory location using the second encryption/decryption method, wherein the apparatus includes a device for writing a predefined or custom code to the at least one memory location written in response to the read channel using the second encryption/decryption method.

9. The memory device of claim 8, wherein the apparatus configured to prevent the reading of the at least one memory location comprises a device configured to:
associate a flag with the at least one memory location; and
return predefined pattern content for the at least one memory location in response to the read channel using the second encryption/decryption method.

10. The memory device of claim 8, wherein the information representing data is in a block and the at least one memory location is at least one physical block address.

11. The memory device of claim 10, further comprising an indirection system that comprises:
at least one logical block address; and
a database configured to map the at least one logical block address to the at least one physical block address.

12. The memory device of claim 11, wherein the indirection system further comprises an apparatus configured to indicate the at least one logical block address inaccessible in response to the read channel using the second encryption/decryption method.

13. The memory device of claim 12, wherein a second encryption parameter associated with the second encryption/decryption method differs from a first encryption parameter associated with the first encryption/decryption method.

14. The memory device of claim 11, wherein a second encryption range parameter associated with the second encryption/decryption method differs from a first encryption range parameter associated with the first encryption/decryption method.

15. The memory device of claim 11, wherein a second encryption key parameter of the second encryption/decryption method differs from a first encryption key parameter of the first encryption/decryption method.

16. A storage apparatus, comprising:
a storage medium including a plurality of memory locations;
a write channel connected to the storage medium and configured to write information representing data to the plurality of memory locations;
a read channel connected to the storage medium configured to read information representing data from the plurality of memory locations;
a controller connected to the storage medium, the read channel and the write channel and configured to:
  control the write channel to write information to the plurality of memory locations;
  control the read channel to read information representing data from the plurality of memory locations;
  in response to an indication that the write channel wrote information to at least one memory location of the plurality of memory locations using a first encryption/decryption method, prevent the read channel from reading the at least one memory location using a second, different encryption/decryption method; and
  cause the write channel to write the respective physical block address with a predefined or custom code in response to a change in the encryption/decryption method from the first encryption/decryption method to the second, different encryption/decryption method.

17. The storage apparatus of claim 16, wherein the controller is further configured to return all the predefined or custom code in response to receiving an indication of a change in the encryption/decryption method from the first encryption/decryption method to the second, different encryption/decryption method.

18. The storage apparatus of claim 16, wherein the controller is further configured to remove a pointer in the map between the respective logical block address and the respective physical block address in response to an indication of a change in the encryption/decryption method from the first encryption/decryption method to the second, different encryption/decryption method.

19. The storage apparatus of claim 16, wherein the controller is configured to generate a flag indicating information at a respective physical block address is invalid in response to an indication of a change in the encryption/decryption method from the first encryption/decryption method to the second, different encryption/decryption method.

20. A storage apparatus, comprising:
a storage medium including a plurality of memory locations;

a write channel configured to write information representing data to the plurality of memory locations;
a read channel configured to read information representing data from the plurality of memory locations;
a controller configured to:
  control the write channel to write information to the plurality of memory locations;
  control the read channel to read information representing data from the plurality of memory locations;
  in response to an indication that the write channel wrote information to at least one memory location of the plurality of memory locations using a first encryption/decryption method, prevent the read channel from reading the at least one memory location using a second, different encryption/decryption method; and
  cause the write channel to write the respective physical block address with a predefined or custom code in response to a change in the encryption/decryption method from the first encryption/decryption method to the second, different encryption/decryption method;
a set of logical block addresses;
a set of physical block address that correspond to the plurality of physical memory locations in the solid state device of the storage apparatus; and
a map that associates a logical block addresses to at least one physical block address, the map also including at least one flag indicating an encryption/decryption method used to write and read data from the physical block address, wherein the controller returns a reading of a predefined or custom code when the encryption/decryption method used to read the physical block address has changed and renders the physical block address inaccessible when the encryption/decryption method used to read the physical block address is different from the encryption/decryption method used to write the physical block address.

* * * * *